US008797844B1

(12) United States Patent
Strahle et al.

(10) Patent No.: US 8,797,844 B1
(45) Date of Patent: Aug. 5, 2014

(54) SCHEDULING TRAFFIC OVER AGGREGATED BUNDLES OF LINKS

(75) Inventors: Norm Strahle, Action, MA (US); Ravikumar Tulugu, AndhraPradesh (IN); Andrzej Szyszko, Holden, MA (US); Aditya Thakur, Kanata (CA)

(73) Assignee: Juniper Networks, Inc., Sunnyvale, CA (US)

( * ) Notice: Subject to any disclaimer, the term of this patent is extended or adjusted under 35 U.S.C. 154(b) by 193 days.

(21) Appl. No.: 13/340,182

(22) Filed: Dec. 29, 2011

(51) Int. Cl.
*H04L 12/26* (2006.01)

(52) U.S. Cl.
USPC .......................................................... 370/219

(58) Field of Classification Search
None
See application file for complete search history.

(56) References Cited

U.S. PATENT DOCUMENTS

| | | | |
|---|---|---|---|
| 6,847,645 B1 | 1/2005 | Potter et al. | |
| 6,976,154 B1 | 12/2005 | Dyckerhoff et al. | |
| 7,184,437 B1 | 2/2007 | Cole et al. | |
| 7,447,149 B1* | 11/2008 | Beesley et al. | 370/217 |
| 7,602,702 B1 | 10/2009 | Aggarwal | |
| 7,606,154 B1 | 10/2009 | Lee | |
| 7,936,770 B1* | 5/2011 | Frattura et al. | 370/412 |
| 8,077,726 B1 | 12/2011 | Kumar et al. | |
| 8,339,959 B1 | 12/2012 | Moisand et al. | |
| 8,369,345 B1 | 2/2013 | Raghunathan et al. | |
| 2003/0099218 A1 | 5/2003 | Tillotson | |
| 2003/0193955 A1* | 10/2003 | Beshai | 370/395.4 |
| 2005/0198371 A1* | 9/2005 | Smith et al. | 709/238 |
| 2006/0126496 A1 | 6/2006 | Filsfils et al. | |
| 2008/0044181 A1 | 2/2008 | Sindhu | |
| 2008/0291928 A1* | 11/2008 | Tadimeti et al. | 370/401 |
| 2009/0252033 A1* | 10/2009 | Ramakrishnan et al. | 370/228 |
| 2010/0296517 A1 | 11/2010 | Kompella | |

OTHER PUBLICATIONS

U.S. Appl. No. 13/162,157, filed Jun. 16, 2011 entitled Active-Active Multi-Homing With Multi-Chassis Pseudowire Link Aggregation.
IEEE Std. 802.3ad-2000, "Amendment to Carrier Sense Multiple Access with Collision Detection (CSMA/CD) Access Method and Physical Layer Specifications—Aggregation of Multiple Link Segments", 2000,183 pgs.
IEEE Draft Standard 802.1ag, "Virtual Bridged Local Area Networks—Amendment 5: Connectivity Fault Management," LAN MAN Standards Committee, dated Sep. 19, 2005.
U.S. Appl. No. 10/045,717, filed Oct. 19, 2001 entitled Network Routing Using Indirect Next Hop Data.

(Continued)

*Primary Examiner* — Chi Pham
*Assistant Examiner* — Raul Rivas
(74) *Attorney, Agent, or Firm* — Shumaker & Sieffert, P.A.

(57) ABSTRACT

In general, techniques are described for scheduling traffic for delivery over an aggregated bundle of links. The techniques may be implemented by a network device comprising a control unit. The control unit configures a primary logical interface such that the primary logical interface is associated with a primary link of the aggregated bundle of links. The primary logical interface is associated with a primary scheduling module that schedules the traffic for delivery via the primary link. The control unit further, prior to detecting a failure associated with the primary scheduling module, configures a backup logical interface such that the backup logical interface is associated with a backup link of the aggregated bundle links. The backup logical interface is associated with a backup scheduling module that schedules, in response to detecting the failure associated with the primary scheduling module, the traffic for delivery downstream via the backup link.

28 Claims, 6 Drawing Sheets

(56) References Cited

OTHER PUBLICATIONS

U.S. Appl. No. 12/391,859, filed Feb. 24, 2009 entitled Fast Reroute for Multiple Label Switched Paths Sharing a Single Interface.

Awduche et al., "RSVP-TE: Extensions to RSVP for LSP Tunnels," RFC 3209, Network Working Group, The Internet Society, Dec. 2001, 62 pp.

IEEE Draft Standard 802.1ag, "Virtual Bridged Local Area Networks—Amendment 5: Connectivity Fault Management," LAN MAN Standards Committee, Dec. 17, 2007, 259 pp.

Katz et al., "Bidirectional Forwarding Detection (BFD)" Internet Engineering Task Force (IETF), RFC 5880, Jun. 2010, 49 pp.

Pan et al., "Fast Reroute Extensions to RSVP-TE for LSP Tunnels," Network Working Group, RFC 4090, May 2005, 36 pp.

Rosen et al., "Multiprotocol Label Switching Architecture," RFC 3031, Network Working Group, The Internet Society, Jan. 2001, 62 pp.

Zimmerman, "OSI Reference Model—The ISO Model of Architecture for Open Systems Interconnection," IEE Transaction on Communications, vol. Com-28, No. 4, Apr. 1980, 8 pp.

IEEE Std. 802.3ah-2004, "Part 3: Carrier Sense Multiple Access with Collision Detection (CSMA/CD) Access Method and Physical Layer Specifications, Amendment: Media Access Control Parameters, Physical Layers and Management Parameters for Subscriber Access Networks," Sep. 7, 2004, 640 pp.

U.S. Appl. No. 13/630,458 by Grandhi et al., filed Sep. 28, 2012.

U.S. Appl. No. 13/536,487 by Atlas et al., filed Jun. 28, 2012.

U.S. Appl. No. 13/952,223 by Rustagi et al., filed Jul. 26, 2013.

\* cited by examiner

SCHEDULING TRAFFIC OVER AGGREGATED BUNDLES OF LINKS

TECHNICAL FIELD

The invention relates to network devices and, more particularly, allocating resources within network devices for scheduling traffic.

BACKGROUND

In computer networks, a network device may be connected to one or more network devices via two or more links. In some cases, these two or more links may be logically grouped or aggregated together to form an "aggregated bundle." For example, one or more routers may be connected to an access node via an aggregate bundle of multiple physical links.

Generally, link aggregation may improve bandwidth in comparison to that of a single link, while also providing connection redundancy. That is, aggregation of links into logical bundles may result in an available bandwidth of all of the aggregated links combined. In addition, should one of the links of the aggregated bundle fail, the network device may begin sending traffic to the other network device across the non-failed links of the aggregated bundle, thereby providing redundancy in the form of redundant links for delivery of traffic between two devices. While aggregated bundles may provide for improved bandwidth and redundancy, it is often difficult to schedule traffic to meet specific classes of service, such as the particular classes of service that a service provider may have agreed to provide to its subscribers while also utilizing the increased bandwidth provided by such aggregated bundles.

SUMMARY

In general, techniques are described for scheduling traffic over aggregated bundles of two or more links. A network device, such as a router, may implement various aspects of the techniques to perform targeted scheduling of traffic for a subscriber over a single link of the aggregated bundle of two or more links. A plurality of logical interfaces may be defined and associated with the same aggregate bundle of physical links. For example, the router may create a virtual or logical interface to provide an abstraction representative of each subscriber. Each logical interface may be associated with a primary scheduling module that includes scheduling resources used for scheduling the traffic, such as queues, shapers, policers, filters and/or rate-limiters. The router may then schedule traffic for the corresponding subscriber using the associated logical interface such that all traffic for the subscriber is sent via a single link of the aggregated bundle of two or more links. Because all of the traffic for this logical interface (which may comprise one or more data flows) is sent through a single primary link of the aggregated bundle of two or more links, the router may apply a single set of services to all of the data flows to potentially provide accurate class of service scheduling.

The router may also implement the techniques to configure one or more backup links for the logical interface associated with each subscriber, where the router may configure one or more backup scheduling units prior to the failure of the primary scheduling module. In this sense, the router pre-provisions the logical interface with one or more backup scheduling modules so as to provide what may be considered nearly seamless failover from the primary scheduling module to the backup scheduling module in terms of the quickness with which traffic for the logical interface may be forwarded in the event of a failure of the primary link. The router may also select these backup links and configure the backup scheduling modules on line cards and/or chassis of the router different from the line card or chassis on which the primary scheduling module has been configured. In this manner, the techniques may ensure redundancy in the event of a failure of the primary link, line card and/or chassis.

The router may distribute the logical interfaces for the different subscribers across the physical links in the bundle so that the full bandwidth of the bundle can be used. Since all of the data flows for a single logical interface are sent thru a single, primary link, all of the data flows thru a single set of class of service resources and accurate scheduling can be achieved.

In one embodiment, a method comprises configuring, with a control unit of a network device, a primary logical interface of a plurality of primary logical interfaces for a subscriber of a plurality of subscribers of one or more services provided by a service provider network over an aggregated bundle of two or more links such that the primary logical interface is associated with a first primary link of the aggregated bundle of two or more links, wherein the primary logical interface is configured to be associated with a primary scheduling module that schedules traffic associated with the subscriber for delivery downstream to the subscriber via the first primary link of the aggregated bundle of two or more links. The method further comprises, prior to detecting a failure associated with the primary scheduling module, configuring, with the control unit, a backup logical interface of a plurality of backup logical interfaces for the subscriber of the plurality of subscribers such that the backup logical interface is associated with a second backup link of the aggregated bundle of two or more links, wherein the backup logical interface is configured to be associated with a backup scheduling module that schedules, in response to detecting the failure associated with the primary scheduling module, the traffic associated with the subscriber for delivery downstream to the subscriber via the second backup link of the aggregated bundle of two or more links. In addition, the plurality of primary logical interfaces and the plurality of backup logical interfaces are configured for each of the plurality of subscribers to be evenly distributed over the aggregated bundle of two or more links.

In another embodiment, a network device comprises a control unit that configures a primary logical interface of a plurality of primary logical interfaces for a subscriber of a plurality of subscribers of one or more services provided by a service provider network over an aggregated bundle of two or more links such that the primary logical interface is associated with a first primary link of the aggregated bundle of two or more links, wherein the primary logical interface is configured to be associated with a primary scheduling module that schedules traffic associated with the subscriber for delivery downstream to the subscriber via the first primary link of the aggregated bundle of two or more links. The control unit further, prior to detecting a failure associated with the primary scheduling module, configures a backup logical interface of a plurality of backup logical interfaces for the subscriber of the plurality of subscribers such that the backup logical interface is associated with a second backup link of the aggregated bundle of two or more links, wherein the backup logical interface is configured to be associated with a backup scheduling module that schedules, in response to detecting the failure associated with the primary scheduling module, the traffic associated with the subscriber for delivery downstream to the subscriber via the second backup link of the aggregated bundle of two or more links. Furthermore, the control unit configures the plurality of primary logical interfaces and the plurality of backup logical interfaces for each of the plurality of subscribers to be evenly distributed over the aggregated bundle of two or more links.

In another embodiment, a non-transitory computer-readable medium comprises instructions that, when executed, cause one or more processors of a network device to configure a primary logical interface of a plurality of primary logical interfaces for a subscriber of a plurality of subscribers of one or more services provided by a service provider network over an aggregated bundle of two or more links such that the primary logical interface is associated with a first primary link of the aggregated bundle of two or more links, wherein the primary logical interface is configured to be associated with a primary scheduling module that schedules traffic associated with the subscriber for delivery downstream to the subscriber via the first primary link of the aggregated bundle of two or more links, and prior to detecting a failure associated with the primary scheduling module, configure, with the control unit, a backup logical interface of a plurality of backup logical interfaces for the subscriber of the plurality of subscribers such that the backup logical interface is associated with a second backup link of the aggregated bundle of two or more links, wherein the backup logical interface is configured to be associated with a backup scheduling module that schedules, in response to detecting the failure associated with the primary scheduling module, the traffic associated with the subscriber for delivery downstream to the subscriber via the second backup link of the aggregated bundle of two or more links, and wherein the plurality of primary logical interfaces and the plurality of backup logical interfaces are configured for each of the plurality of subscribers to be evenly distributed over the aggregated bundle of two or more links.

In another embodiment, a method comprises configuring, with a control unit of a network device, a primary logical interface of a plurality of primary logical interfaces to schedule traffic for delivery over an aggregated bundle of two or more links such that the primary logical interface is associated with a first primary link of the aggregated bundle of two or more links, wherein the primary logical interface is configured to be associated with a primary scheduling module that schedules the traffic for delivery via the first primary link of the aggregated bundle of two or more links. The method also comprises, prior to detecting a failure associated with the primary scheduling module, configuring, with the control unit, a backup logical interface of a plurality of backup logical interfaces such that the backup logical interface is associated with a second backup link of the aggregated bundle of two or more links, wherein the backup logical interface is configured to be associated with a backup scheduling module that schedules, in response to detecting the failure associated with the primary scheduling module, the traffic for delivery downstream via the second backup link of the aggregated bundle of two or more links. Further, the plurality of primary logical interfaces and the plurality of backup logical interfaces are configured to be evenly distributed over the aggregated bundle of two or more links.

The details of one or more embodiments of the techniques are set forth in the accompanying drawings and the description below. Other features, objects, and advantages of the techniques will be apparent from the description and drawings, and from the claims.

DETAILED DESCRIPTION

Figure 1:
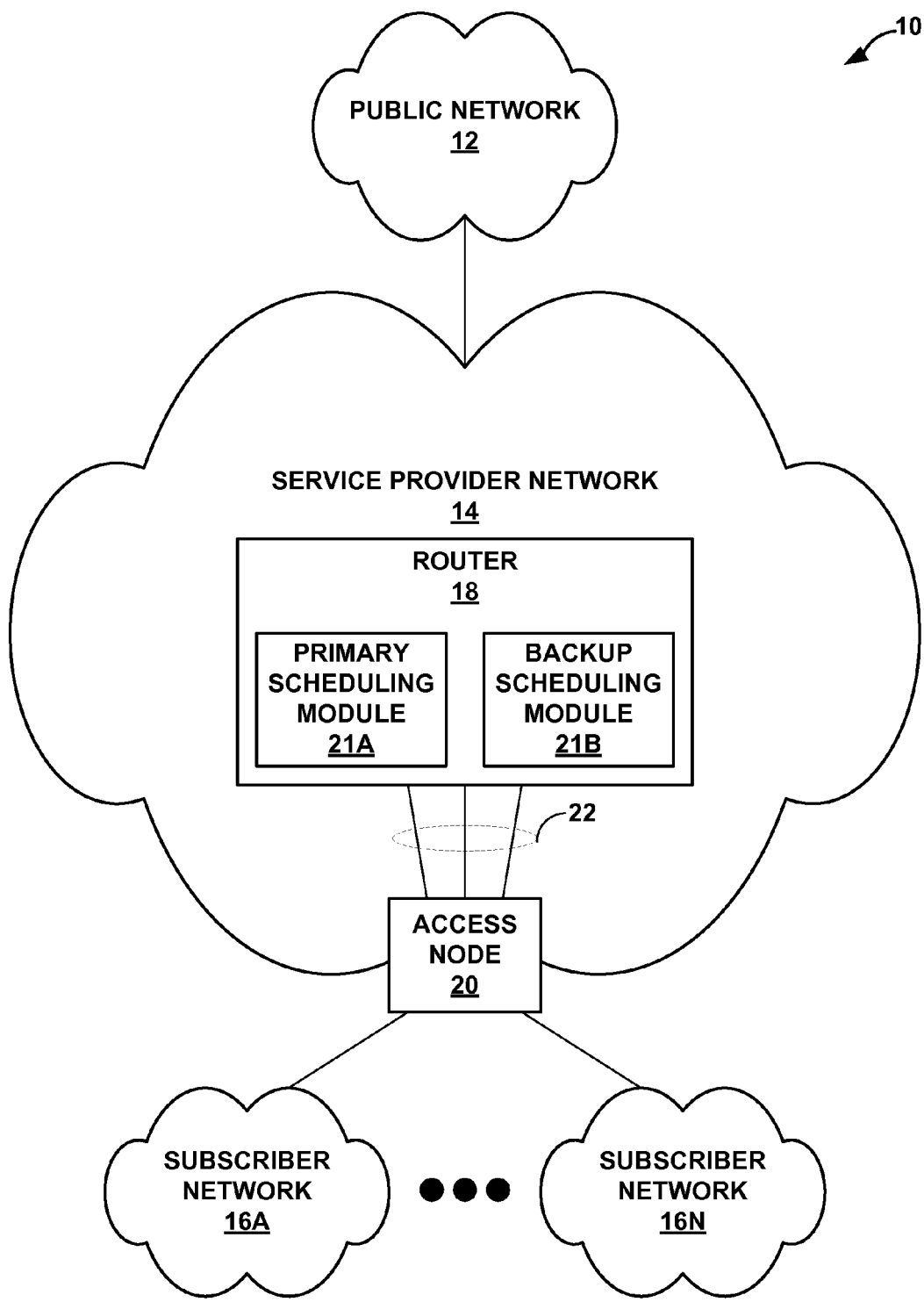
FIG. 1 is a block diagram illustrating a network system that implements the aggregated bundle scheduling techniques described in this disclosure.

FIG. 1 is a block diagram illustrating an example network system 10 that implements the aggregated bundle scheduling techniques described in this disclosure. In the example of FIG. 1, network system 10 includes a public network 12, a service provider network 14 and a plurality of subscriber networks 16A-16N ("subscriber networks 16"). While shown as including public network 12, service provider network 14 and subscriber networks 16, network system 10 is merely one example of the type of network system in which the techniques of this disclosure may be implemented. While not shown in the example of FIG. 1, network system 10 may include additional service provider networks, subscriber networks and other types of networks, such as access networks, private networks, or any other type of network commonly employed to deliver one or more services (such as data service, Internet Protocol Television (IPTV) service, voice over Internet Protocol (VoIP) service, video telephony service or any other type of service) to subscriber networks.

Public network 12 represents a network that is generally publically accessible by any network-capable device having a network connection. Public network 12 may represent a network that is commonly referred to as the Internet, which refers to a public layer three (L3) packet-switched network (where reference to a layer followed by a number in this disclosure refers to the corresponding layer in the Open Systems Interconnection (OSI) model). Although not shown in the example of FIG. 1, public network 12 generally includes a collection of interconnected network devices, such as data servers, application servers, print servers, laptop computers, desktop computers, workstations, cellular phones (including so-called "smart phones"), routers, switches, and hubs, to name a few by way of example. Typically, while publically available, public network 12 is only accessible by network-capable devices that have an active network connection, where such network connections are commonly provided by service provider networks, such as service provider network 14 in the form of what is typically referred to as a "data service."

Service provider network 14 represents one or more networks owned and operated by a service provider (which is commonly a private entity) that offer one or more services for consumption by subscriber networks, such as subscriber networks 16. Service provider network 14 is typically a L3 packet-switched network that provides L3 connectivity between public network 12 and subscriber network 16. Often, this L3 connectivity provided by service provider network 14 is marketed as a data service or Internet service, and subscribers may subscribe to this data service. Recently, services provided by way of different types of networks from the service provider's L3 packet-switched network, such as telephone service or television service, are being provided by via the service provider's L3 packet-switched network in the form of VoIP, video on domain (VoD) and IPTV, respectively. As a result, service provider network 14 may provide what is referred to as a "triple-play package" of services that include each of data, voice and television services over the L3 packet-switched network. Thus, service provider network 14 may represent a L3 packet-switched network that provides data, voice, television and any other type of service for purchase by subscribers and subsequent consumption by subscriber networks 16.

Subscriber networks 16 each represent a network owned and operated by a subscriber of one or more of these services provided by service provider network 14. Although not shown in the example of FIG. 1 for ease of illustration purposes, subscriber networks 16 may each include one or more network-capable devices, such as network-capable printers, servers, laptop computers, desktop computers, cellular phones (including smart phones), tablet or slate computers, netbooks, personal media players, game consoles, network-capable high definition disk players (such as a Blu-ray disc player), digital video disc players, Internet-ready televisions, and electronic reading devices.

The subscribers that own and operate subscriber networks 16 may subscribe to one or more services from the service provider that owns and operates service provider network 14, where such subscriber agreements generally indicate a level of service, quality of service or class of service with which the service provider generally agrees to provide each of the one or more services. For example, one of the subscribers that owns and operates a corresponding one of subscriber networks 16 may subscriber to a data service of a particular bandwidth, such as 10 megabits per second (Mbps) usually at a class of service lower than that to which the service provider agrees to provide less latency tolerant services, such as IPTV or VoIP. In some instances, the service provider may agree to provide all services to which the subscriber subscribes at a given class of service. Whether on an individual service basis or a subscriber basis, the service provider generally agrees to provide services to which any given one of its subscribers according to an agreed upon class of service.

In order to provide these services in accordance with the agreed upon one or more classes of service, network devices of service provider network 14 that forward traffic corresponding to these services implement scheduling algorithms to schedule this subscriber traffic for delivery downstream (meaning, from public network 12 to subscriber networks 16) to subscriber networks 16 in a manner that delivers this traffic to meet the one or more classes of services associated with this subscriber. These scheduling algorithms may include a weighted fair queuing (WFQ) algorithm, however, WFQ algorithms are generally difficult to implement in that it requires substantial computations to correctly implement WFQ. Thus, the scheduling algorithms may include approximate WFQ algorithms, such as a Weighted Round-Robin (WRR) scheduling algorithm and a Deficit Round-Robin (DRR) scheduling algorithm. Alternatively, the scheduling algorithm may include the scheduling algorithm set forth in U.S. Pat. No. 7,606,154, entitled "Fair Bandwidth Allocation Based on Configurable Service Classes," filed Apr. 1, 2004, which is hereby incorporated by reference as if set forth in its entirety herein. These scheduling algorithms seek to schedule traffic in a manner that fairly allocates bandwidth to each data flow such that class of service agreements may be met while also meeting any latency requirements, which may also form a part of the class of service.

As further shown in the example of FIG. 1, service provider network 14 includes an exemplary network device shown as "router 18" and another network device shown as "access device 20." Router 18 represents any network device that routes or otherwise forwards traffic upstream from and downstream to subscriber networks 16. Typically, router 18 represents a L3 packet-switching device that operates at L3 to receive routing information describing a current topology of service provider network 14. Router 18 then processes this routing information, selecting paths through its representation of the topology of service provider network 14 to reach all available destinations to generate forwarding information. In other words, router 18 reduces these paths to so-called "next hops" which identify which of its interfaces traffic destined for a particular destination is to be forwarded, where the forwarding information includes this list of next hops. Router 18 then installs this forwarding information in a forwarding plane of router 18, whereupon the forwarding plane forwards received traffic in accordance with the forwarding information.

Access device 20 represents a network device that facilitates access by subscriber networks 16 to service provider network 14. Examples of access device 20 include a digital subscriber line access multiplexer (DSLAM) and a cable modem termination system (CMTS). Typically, access device 20 aggregates upstream traffic from subscriber networks 16 destined for public network 12 and de-aggregates (or de-multiplexes) aggregated downstream traffic from public network 12 destined to individual ones of subscriber networks 16. In some instances, access device 20 may duplicate some types of downstream traffic (e.g., broadcast and multicast traffic) and deliver this duplicated traffic to subscriber devices 16.

Often, service providers employ what is referred to as "aggregated bundles" to interconnect routers and access nodes via two or more links. Example aggregated bundles include aggregated Ethernet bundles, which may be configured and maintained using a link aggregation control protocol (LACP), as defined in IEEE 802.3ad, Aggregation of Multiple Link Segments, the contents of which are incorporated herein by reference. Logically, these aggregated bundles appear as a single connection to the router and/or the access node. Aggregated bundles provide a number of benefits. First, aggregated bundles may provide redundancy of connection between the routers and access nodes. To illustrate, should one of the link of the aggregated bundle fail, the router and access node interconnected by the aggregated bundle may redirect traffic previously being sent over the failed links of the aggregated bundle to one of the active links of the aggregated bundle, thereby providing redundancy of connection between a router and an access node. Second, use of aggregated bundles may provide increased network capacity (which is often measured in terms of bandwidth) considering that the multiple links of the aggregated bundle may be employed to deliver traffic rather than a single link. Third, aggregated bundles may promote bandwidth scalability in that a service provider may establish an aggregated bundle with two links, as one example, and then incrementally increase the number of links in the aggregated bundle in response to increased subscriber bandwidth demand. In this manner, the service provider may slow capital outlays by only providing sufficient bandwidth to meet current subscriber bandwidth demand rather than expected future subscriber bandwidth demand. Further exemplary details of multi-chassis link aggregation are illustrated in U.S. patent application 13/162,157, entitled "ACTIVE-ACTIVE MULTI-HOMING WITH MULTI-CHASSIS PSEUDOWIRE LINK AGGREGATION," hereby incorporated by reference.

While aggregated bundles may provide for improved redundancy, bandwidth and scalability, the routers and/or access node may experience difficulties in scheduling traffic to meet the class of service that the service provider have agreed to provide to its subscribers while also utilizing the increased bandwidth provided by such aggregated bundles. To illustrate, consider one deployment of aggregated bundles that allocates a (often, equal) portion of a subscriber's bandwidth that the service provider has agreed to provide a subscriber in its class of service terms to each link of the aggregated bundle. For example, if a subscriber has purchased a 12 Mbps service, the service provider may configure its router to provide ⅓ of this 12 Mpbs over each of three links of the aggregated bundle. Yet, this deployment of aggregated bundles is inadequate as the subscriber traffic flows (where a flow is commonly identified by a so-called five tuple that includes a source address, source port, destination address, destination port and a protocol) may not be evenly distributed across the links of the aggregated bundle resulting in incorrect application of class of service, such as shaping (filtering), policing, buffering, prioritized queuing, etc. Moreover, some flows may consume more bandwidth than others, such that the router may shape some flows so that they do not exceed the per-link bandwidth cap (i.e., 4 Mbps in the example above) despite that flows over the other two links are not consuming the entire 4 Mbps allocated for the corresponding subscriber on those links.

Another aggregated bundle deployment defines links as active and standby at the link (or layer two of the OSI model) level so that all active traffic flows over an aggregated bundle use half the links of the aggregated bundle. This deployment may promote more accurate shaping than in the previously discussed deployment, while also providing connection redundancy. Yet, this active/standby deployment limits bandwidth to a single link, losing the scalability and improved bandwidth aspects of using aggregated bundles.

In addition to these difficulties in taking advantage of the benefits provided by aggregated bundles while also ensuring accurate or at least reasonable class of service scheduling, in many aggregated bundle deployments, implementation of aggregated bundle handling within routers may not promote fast failover from a failed link of the aggregated bundle to the active link. The router was often configured in these aggregated bundle deployments to represent a subscriber logically using what is referred to as a "logical interface." This logical interface generally includes a single scheduler to facilitate class of service scheduling of traffic for the associated subscriber. This single scheduler includes scheduling resources, such as queues, shapers, policers, filters and/or rate-limiters, used for scheduling the subscriber's traffic in accordance with the agreed upon one or more classes of service. Upon failure of one of the links, interface, line card, chassis or other failure associated with the scheduler of the aggregated bundle used for forwarding subscriber traffic, the router typically only then created or instantiated a backup scheduler for each of the subscribers impacted by the failed link of the aggregated bundle. After creating the backup scheduler, the router then updated forwarding information to reference this backup scheduler, as commonly the router would have to redefine the virtual or logical interface in a new virtual location to accommodate this new backup scheduler associated with one of the active links. This process of creating or instantiating backup schedulers only after the failure has occurred inserts delay during the failover from the failed link to one of the active links of the aggregated bundle.

Typically, the router did not instantiate these backup schedulers prior to the failure of the link because the scheduler was a configurable hardware component within a hardware forwarding plane. A forwarding plane commonly refers to dedicated hardware within the router responsible for the forwarding of subscriber and other traffic (such as control traffic) to its intended destination (which in the case of control traffic may include a so-called routing plane of the router). The router may also include a routing plane that performs routing functionality to resolve the above-noted routing information and generate the above-noted forwarding information, which it then installs in the forwarding plane. The forwarding plane based forwarding of the traffic on this forwarding information. As noted above, this forwarding information may include the so-called "next hops" described above. Because hardware is typically expensive in terms of cost and routers may lack board space (meaning physical silicon board space) to accommodate a large amount of any physical resource, such as memory, processors, field programmable gate arrays (FPGAs), digital signal processors (DSPs), network processors and the like, the router may not have sufficient physical resources for use in defining both primary and backup schedulers for all of the subscribers currently connected to that router, especially considering that in some context thousands or more subscribers may require schedulers at any given time.

In accordance with the techniques described in this disclosure, router 18 may schedule traffic for the subscriber using an associated logical interface such that all traffic for the subscriber is sent via a single link of the aggregated bundle of two or more links. That is, router 18 may configure a primary scheduling module 21A and associate this primary scheduling module 21A with the logical interface instantiated for the corresponding subscriber. This primary scheduling module 21 may include the scheduling resources described above that are used for providing the agreed-upon class of service. Because route 18 sends all of the traffic for this logical interface (which may comprise one or more data flows) through a single primary link of aggregated bundle 22, router 18 may apply a single set of services to all of the data flows to potentially provide accurate class of service scheduling. That is, primary scheduling module 21A may receive and process all traffic for the corresponding subscriber in a manner that schedules this subscriber traffic for delivery downstream to meet the agreed-upon class of service (to a certain extent, as many subscriber agreements provide for certain terms that do not require service providers to meet this class of service during busy times of high network congestion). In the example of FIG. 1, aggregated bundle 22 is shown as a dashed circle encompassing two or more links, which are shown in the example of FIG. 1 as solid lines between router 18 and access node 20.

Router 18 may also implement the techniques to configure one or more backup links for the logical interface, where router 18 may configure one or more backup scheduling units, such as backup scheduling unit 21B included within router 18, associated with the logical interface prior to the failure of the primary scheduling module. In this sense, router 18 pre-provisions the logical interface with backup scheduling module 21B so as to promote faster failover from the primary scheduling module to the backup scheduling module in terms of the quickness with which traffic for the logical interface may be forwarded in the event of a failure of the primary link. Router 18 may also select these backup links and configure this backup scheduling module 21B on line cards and/or chassis (whether physical or virtual, which is described below in more detail with respect to FIG. 6) of the router different from the line card or chassis on which primary scheduling module 21A has been configured rather than require instantiation of backup scheduler module 21B on the same line card as is common in conventional aggregated bundle-enabled routers. In this manner, the techniques may ensure redundancy in the event of a failure of the primary link, line card, and/or chassis of router 18.

Additionally, router 18 may utilize each of the links in aggregated bundle 22 by dispersing subscriber traffic destined for each of subscriber networks 16 across each of the links of aggregated bundle 22. That is, router 18 may distribute the primary links for each of subscriber networks 16 across the different physical links of the aggregate bundle 22 in an attempt to balance subscriber traffic across the physical links. Thus, router 18 may make use of the increased bandwidth, redundancy and scalability provided by aggregated bundle 22, while also promoting more accurate class of service scheduling.

In operation, router 18 configures primary scheduling module 21A for a subscriber of one or more services provided by a service provider network. This primary scheduling module 21A schedules traffic associated with the subscriber for delivery downstream to the subscriber via a first primary link of aggregated bundle 22. Primary scheduling module 21A may represent a module that implements one or more aspects of the hierarchical scheduling techniques described in the above incorporated U.S. Pat. No. 7,606,154, entitled "Fair Bandwidth Allocation Based on Configurable Service Classes," and filed Apr. 1, 2004. Alternatively, primary scheduling module 21A may implement any type of round-robin, deficit round robin or other type of weighted fair queuing algorithm, as well as, prioritized queing. Router 18 may configure primary scheduling module 21A by configuring a hardware component of a forwarding plane of router 18, where the forwarding plane and routing plane distinction is shown in further detail in the example of FIG. 2.

Router 18 also configures backup scheduling module 21B for the subscriber prior to detecting a failure with respect to the primary link of aggregated bundle 22. Backup scheduling module 21B schedules the traffic associated with the subscriber for delivery downstream to the subscriber via a second backup link of aggregated bundle 22 in response to router 18 detecting the failure. Backup scheduling module 21B may represent a module that implements one or more aspects of the hierarchical scheduling techniques described in the above incorporated U.S. Pat. No. 7,606,154, entitled "Fair Bandwidth Allocation Based on Configurable Service Classes," and filed Apr. 1, 2004. Alternatively, backup scheduling module 21B may implement any type of round-robin, deficit round robing or other type of weighted fair queuing algorithm, as well as, prioritized queing. As noted above, the first primary link is different than the second backup link typically in that the first primary link couples to a different line card or chassis than the second backup link.

Once configured in this manner for the subscriber, primary scheduling module 21A may begin to receive downstream traffic associated with the subscriber. Primary scheduling module 21A then schedules the traffic associated with the subscriber, while backup scheduling module 21B does not schedule any traffic until the failure is detected with respect to the first primary link. Router 18 then, at some point, detects the failure typically by way of implementing one or more connectivity fault management (CFM) protocols, where this failure may involve a failure of the link itself, a failure of a port or card of access node 20, and/or a failure of the line card of router 18 that includes primary scheduling module 21A, to list a few examples. In addition, router 18 may employ many other forms of failure detection, some of which involve hardware failure detection or alternative forms of software failure detection executed by hardware. In response to detecting the failure, router 18 fails over scheduling of traffic associated with the subscriber to pre-provisioned backup scheduling module 21B. Backup scheduling module 21B then schedules the traffic associated with the subscriber. Throughout this process, router 18 transmits the scheduled traffic downstream to one of subscriber networks 16 associated with the corresponding subscriber.

While the term "subscriber" as used in this disclosure generally refers to a subscriber of services consumed by a service provider, the techniques should not be limited in this respect and may be implemented in any context in which scheduling is performed to deliver traffic in accordance with one or more classes of service. In these more general contexts, the service may refer to packets or traffic delivered in accordance with a class of service. In addition, the service provider may refer to private or public service providers that generally delivery or otherwise provide these services to the consuming devices. Moreover, the term "subscriber" may refer to individual subscriber devices, where the techniques may be implemented with respect to each subscriber device rather than per subscriber.

Figure 2:
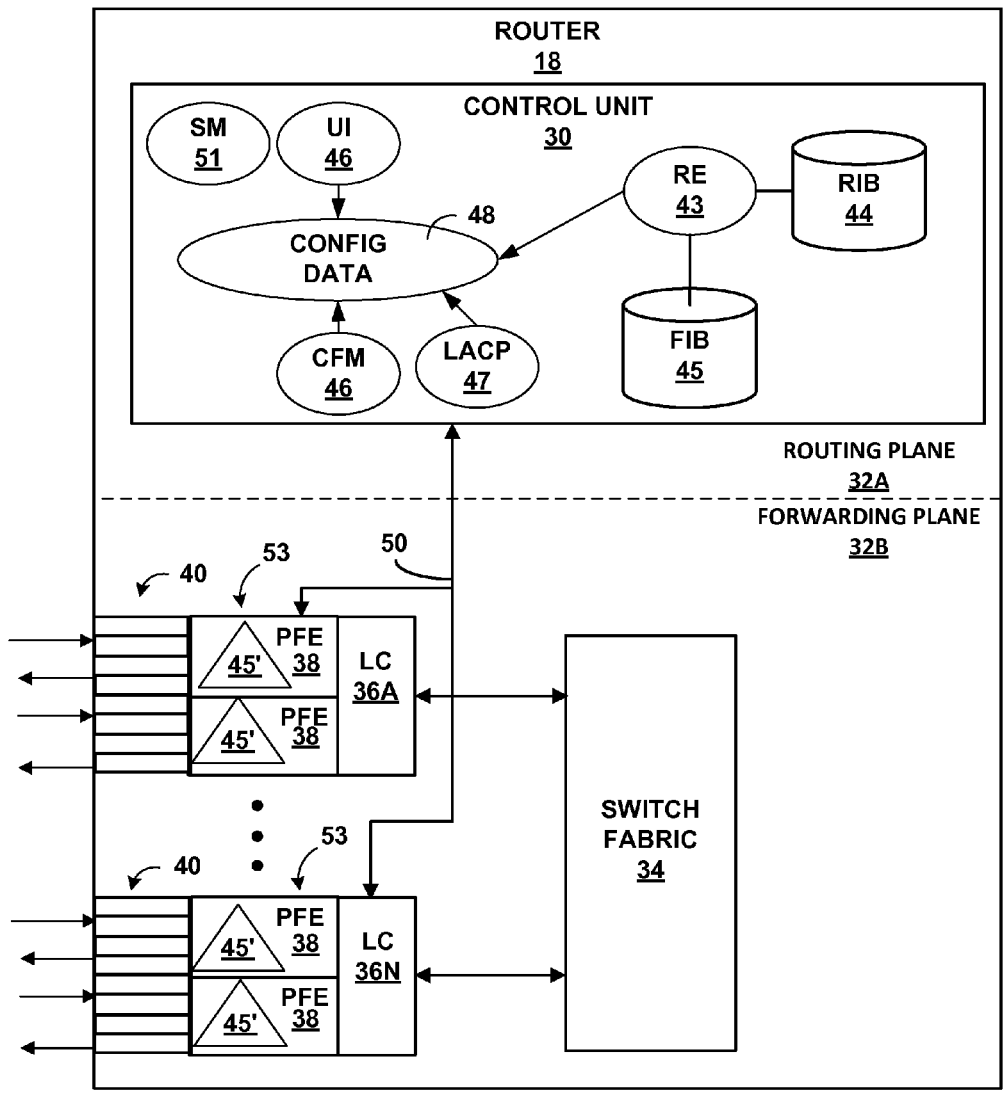
FIG. 2 is a block diagram illustrating a network device of the network system shown in the example of FIG. 1 in more detail.

FIG. 2 is a block diagram illustrating an example embodiment of router 18 of FIG. 1 in more detail. In this example, router 18 includes a control unit 30 that provides control or routing plane functionality for router 18. In the example of FIG. 2, this routing plane is shown as routing plane 32A. Router 18 also includes switch fabric 34 interconnecting a set of line cards ("LCs") 36A-36N, each of which includes a one or more of packet-forwarding engines ("PFEs") 38 that send and receive traffic by a set of interface cards (IFCs) 40 ("IFCs 40") that typically have one or more physical network interfaces (ports). LCs 36, components thereof, and switch fabric 34 collectively provide a data or forwarding plane for forwarding network traffic, such as the downstream and upstream subscriber traffic. This forwarding plane is shown as forwarding plane 32B in the example of FIG. 2. Although not shown in FIG. 2, PFEs 38 may each comprise a central processing unit (CPU), memory and one or more programmable packet-forwarding application-specific integrated circuits (ASICs). Switch fabric 34 provides a high-speed interconnect for forwarding incoming data packets between PFEs 38 for transmission over a network, such as service provider network 14 shown in the example of FIG. 1.

Control unit 30 provides an operating environment for various protocols that perform routing plane functions for router 18. For example, control unit 30 may provide an operating environment for execution of a routing engine (RE) 43 ("RE 43") that implements a routing protocol to control L3 routing functions. In general, routing engine 43 receives and sends routing protocol messages to maintain a routing information based (RIB) 44 ("RIB 44") that stores L3 routing information representative of a topology of service provider network 14. Based on RIB 44, RE 43 generates a forwarding information base (FIB) 45 ("FIB 45") that stores forwarding data structures for installation within (e.g., programming of) PFEs 38.

In the example of FIG. 2, control unit 30 includes a user interface ("UI") module 46 ("UI 46") with which an administrator interacts, either directly or by way of a provisioning system or software agent, to configure one or more logical interfaces corresponding to each of the active subscribers that own and operate subscriber networks 16. UI 46 may receive commands in accordance with a command syntax and store these commands as configuration data 48 ("config data 48"). UI 46 may also receive commands to configure, for each of the logical interfaces, a primary scheduling module and one or more backup scheduling modules, also storing these commands as configuration data 48.

Additionally, control unit 30 includes a subscriber management ("SM") module 51 ("SM 51") that manages subscribers dynamically creating, configuring and/or maintaining logical interfaces corresponding to each of the active subscribers that own and operat subscriber networks 16. SM 51 may create these logical interfaces dynamically in response to detecting one of subscriber devices located in a subscriber networks 16 attempting to access or otherwise login to service provider network 14. SM 51 may configure a primary scheduling module and one or more backup scheduling modules, also storing configuration data to configure these logical interfaces as configuration data 48.

Control unit 30 also includes a connectivity fault management (CFM) module 47 ("CFM 47") that implements various CFM protocols in order to detect faults of links or other forwarding components, such as PFEs 38 and LC 36. To facilitate maintenance of the interconnection between router 18 and access node 20, CFM 46 may implement CFM as described, for example, in the Institute of Electrical and Electronics Engineers (IEEE) 802.1ag standard. CFM may generally enable discovery and verification of a path, through network devices and networks, taken by data units, e.g., frames or packets, addressed to and from specified network users. In addition, control unit 30 includes a link aggregation control protocol (LACP) module 47 that operates to bundle one or more of interfaces 51 into aggregated bundle 22 and treat bundle 22 as a single logical interface in terms of L2 forwarding. While shown as implementing LACP, control unit 30 may implement or otherwise provide an execution environment for any other type of aggregated bundle protocol capable of establishing aggregated bundles of logical and/or physical interfaces. LACP module 47 generally provides the abstraction to maintain aggregated bundle 22.

CFM 46 generally provides a set of protocols by which to perform fault management. One protocol of the CFM set of protocols may involve a periodic transmission of messages to determine, verify or otherwise check continuity between two endpoints and may be referred to as a "continuity check protocol," which is abbreviated as CCP. Another protocol of the CFM set of protocols may involve a user or operator driven protocol by which targeted messages may be sent to specific endpoints requesting a response. The targeted or specific endpoint, may upon receiving the request message, issue a response to the message, such that the request and response loops from the originator of the specific endpoint and back to the originator. This second protocol of the CFM set of protocols may be referred to, for this reason, as a "loopback protocol." More information regarding CFM in general and the CFM set of protocols, including the continuity check protocol and the loopback protocol, can be found in an Institute of Electrical and Electronics Engineers (IEEE) draft standard, titled "Virtual Bridged Local Area Networks—Amendment 5: Connectivity Fault Management," by the LAN MAN Standards Committee, dated Jun. 18, 2007, herein incorporated by reference in its entirety. While described in this disclosure as performing failure detection using CFM 46, the techniques are not limited in this respect and may be implemented with respect to any form of detecting failure associated with a logical interface, as noted above.

In the example of FIG. 2, control unit 30 is connected to each of LCs 36 by a dedicated internal communication link 50. For example, dedicated link 50 may comprise a 200 Mbps or Gigabit Ethernet connection for internal communication between the multiple components of router 18. In one embodiment, control unit 42 communicates data representative of a software copy 45' of FIB 45 into PFEs 38 to program PFEs 38 and thereby control forwarding of traffic by the corresponding components within forwarding plane 32B. This allows the software FIB stored in memory (e.g., on-chip RAM) of in each of PFEs 38 to be updated without degrading packet-forwarding performance of router 18. In some instances, control unit 30 may derive separate and different software FIBs for each respective one of PFEs 38. In addition, one or more of PFEs 38 may include packet-forwarding ASICs (not shown) that PFEs 38 program with a hardware-copy of FIB based on the software FIBs (i.e., hardware versions of the software FIBs) copied to each respective PFE 38. In other, more complex embodiments, router 18 may have many more LCs 50 (e.g., 48 or 64 FPCs), each of which may have up to four PFEs 38 that each couple to up to sixteen interface cards 51.

As noted above, an administrator or other user may interface with control unit 30 via a user interface presented by UI 46. The user may input commands instantiating or otherwise defining a logical interface for a subscriber, such as a subscriber that owns and operates one of subscriber networks 16. Often, the user interfaces with UI 46 remotely via a provisioning system. Commonly, this user is a point-of-sales representative of the service provider that receives service requests from the subscriber. This representative may input the service request via their computer, which in turn interfaces with a provisioning system that interfaces with the router through which the subscriber may gain access to service provider network 14. This provisioning system may interface with UI 46 by executing a pre-configured script associated with the service request.

This pre-configured script may include commands that configure primary logical interface to store class-of-service parameters in the form of a primary scheduling module 21A, which is not shown in the example of FIG. 1 for ease of illustration. However, primary scheduling module 21A is further described below with respect to the detailed examples of forwarding plane 32B shown in FIGS. 3 and 6. Likewise, this pre-configured script may include commands that pre-configure backup logical interface for the subscriber to store the same class-of-service parameters as primary scheduling module 21A in the form of backup scheduling module 21B. SM 51 may perform operations similar to those attributed to the pre-configure script to dynamically create, configure or otherwise maintain logical interfaces.

Again, this backup scheduling module 21B is now shown in the example of FIG. 2 for ease of illustration, but is further described below with respect to the detailed examples of forwarding plane 32B shown in FIGS. 3 and 6. This pre-configured script may include commands that specify whether to assign this backup logical interface to a different link of aggregated bundle 22 from that to which the primary logical interface is assigned, different one of LCs 36 from that to which the primary logical interface is assigned or a different chassis in multiple chassis routers from that to which the primary logical interface is assigned (which, while not shown in FIG. 2, is shown in FIG. 4 below).

Once configured with logical interfaces for this subscriber, control unit 30 installs the primary and one or more backup logical interfaces according to the configuration data 48 within forwarding plane 32B. That is, control unit 30 may interface with one or more LCs 36 or PFEs 38 of one or more LCs 36 to configure hardware or software executing on hardware within these LCs 36 and/or PFEs 38 to provide the primary logical interface and the one or more backup logical interfaces. As part of installing these interfaces, RE 43 inputs these logical interfaces for the subscriber within the routing information stored to RIB 44, where RE 43 then reduces this routing information that includes these interfaces to forwarding information, and stores this forwarding information to FIB 45. This forwarding information may include a series of chained next hops, where one next hop specifies the primary logical interface and another next hop specifies the backup logical interface. Control unit 30 then installs this forwarding information into PFEs 36 as FIB 45'. Control unit 30 may also interface with PFEs 38 to configure these PFEs 38 to use either the next hop associated with the primary logical interface or the backup logical interface, as described below in more detail with respect to FIG. 5.

Once these logical interfaces are installed in forwarding plane 32B, router 18 may begin to receive and forward traffic downstream to the corresponding one of subscriber networks 16. That is, PFEs 38 may receive downstream traffic destined for the one of subscriber networks 16 associated with these newly installed primary logical interface, access FIBs 45' using a five-tuple extracted from this traffic to determine to which of PFEs 36 to forward this traffic and forward this traffic to the determined one of PFEs 38 that includes the primary logical interface via switch fabric 34. This primary logical interface may then invoke the primary scheduling module which performs class of service scheduling to schedule this traffic for delivery in accordance with the agreed-upon one or more classes of service.

CFM 46 may then detect a connectivity failure on a link between router 18 and access node 20 associated with the primary logical interface. Control unit 30 may then interface with PFEs 38 via internal communication link 50 to configure PFEs 38 to use the associated pre-provisioned backup logical interface specified in their copy of FIBs 45' for those primary logical interfaces impacted by the detected failure. In this way, PFEs 38 may select the backup logical interface rather than the primary logical interface and forward traffic received after the failure to the backup logical interface rather than the primary logical interface.

In the event, both the primary and backup logical interfaces are affected by either the same or different failures, control unit 30 may have provisioned, prior to the failure, a failsafe logical interface defining general class of service scheduling parameters in the form of a failsafe scheduling module. This failsafe scheduling module may schedule traffic for any subscribers whose primary and one or more backup logical interfaces have failed. Control unit 30 may install this failsafe scheduling module in all PFEs 38 and configure PFEs 38 to use these failsafe scheduling modules in the event of the failure associated with the primary and one or more backup logical interfaces. This failsafe scheduling module provides further class of service scheduling redundancy.

Additionally, control unit 30 may detect on which port or, in some instances, ports ingress data flows for a primary logical interface from an external device are arriving. Control unit 30 may then dynamically assign class of service scheduling resources in the form of scheduling modules to those ports. Should the external device also guarantee that data flows for a single logical interface will be sent over a single port, control unit 30 may configure class-of-service parameters of the associated scheduler to be the full value (such as the 12 Mbps in terms of the example discussed above), thus guaranteeing accurate application of class-of-service parameters used in performing class-of-service scheduling on ingress as well.

The operating environment of control unit 30 may be implemented solely in hardware, or may be implemented as a combination of hardware and software or firmware. For example, control unit 30 may include one or more processors which execute software instructions. In that case, control unit 30 may include various software modules or daemons executing on an operating system, and may include a non-transitory computer-readable storage device, such as computer memory or hard disk, for storing executable instructions.

The architecture of router 18 illustrated in FIG. 2 is shown for exemplary purposes only. The disclosure is not limited to this architecture. In other embodiments, router 18 may be configured in a variety of ways. In one embodiment, for example, some of the functionally of control unit 30 may be distributed within PFEs 38. Elements of control unit 30 may be implemented solely in software that executes on hardware, or hardware, or may be implemented as combinations of hardware and software or firmware. For example, control unit 30 may include one or more processors, one or more microprocessors, digital signal processors (DSPs), application specific integrated circuits (ASICs), field programmable gate arrays (FPGAs), network processors, or any other equivalent integrated or discrete logic circuitry, or any combination thereof, which execute software instructions. In that case, the various software modules of control unit 30 may comprise executable instructions stored, embodied, or encoded in a non-transitory computer-readable medium, such as a computer-readable storage medium, containing instructions.

Instructions embedded or encoded in a computer-readable medium may cause a programmable processor, or other processor, to perform the method, e.g., when the instructions are executed. Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, a solid state drive, magnetic media, optical media, or other non-transitory computer-readable media. Computer-readable media may be encoded with instructions corresponding to various aspects of router 18, e.g., protocols. Control unit 30, in some examples, retrieves and executes the instructions from memory for these aspects.

Figure 3:
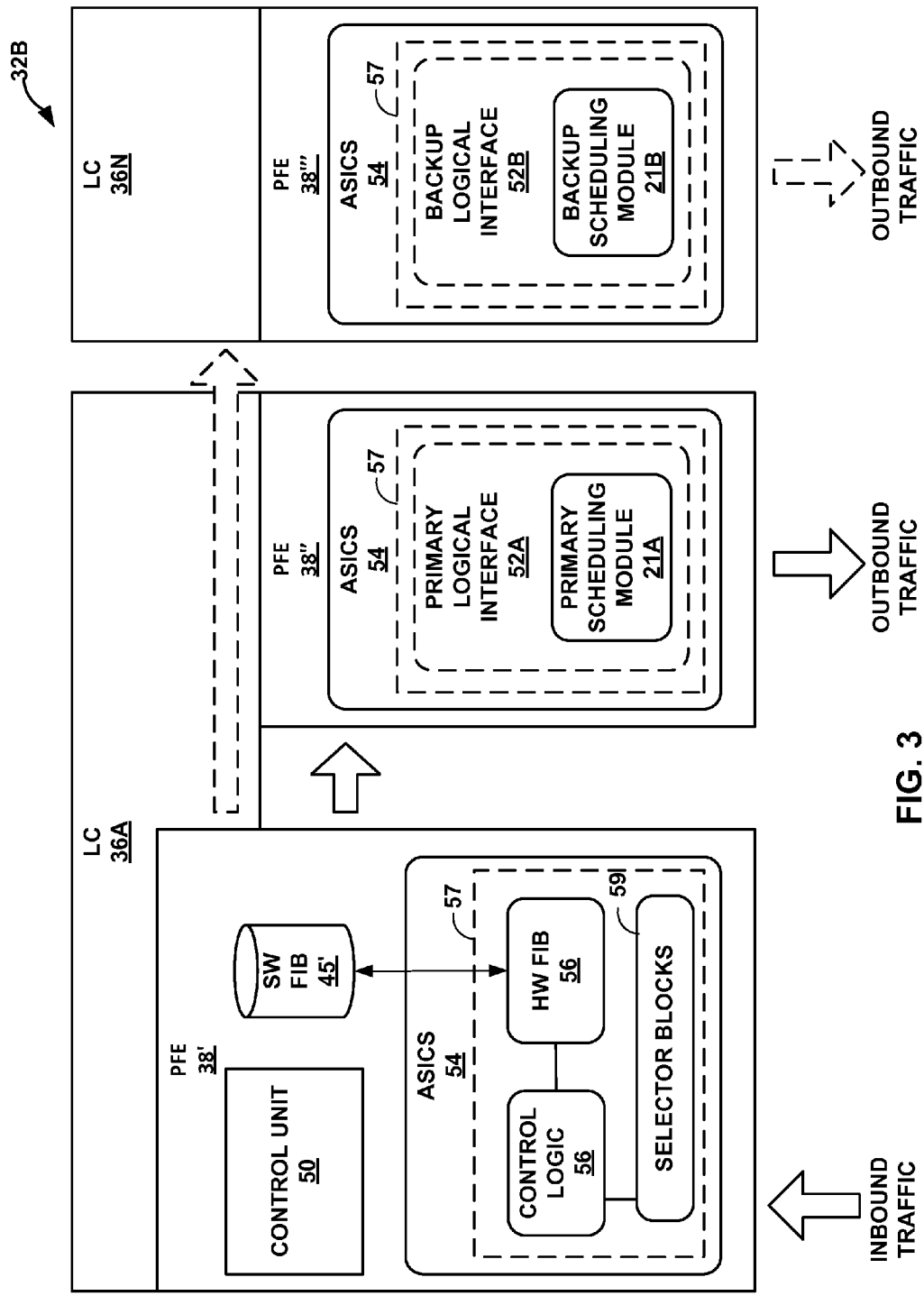
FIG. 3 is a block diagram illustrating various exemplary aspects of forwarding plane of the network device shown in the example of FIG. 2 in implementing the aggregated bundle scheduling techniques described in this disclosure
Figure 4:
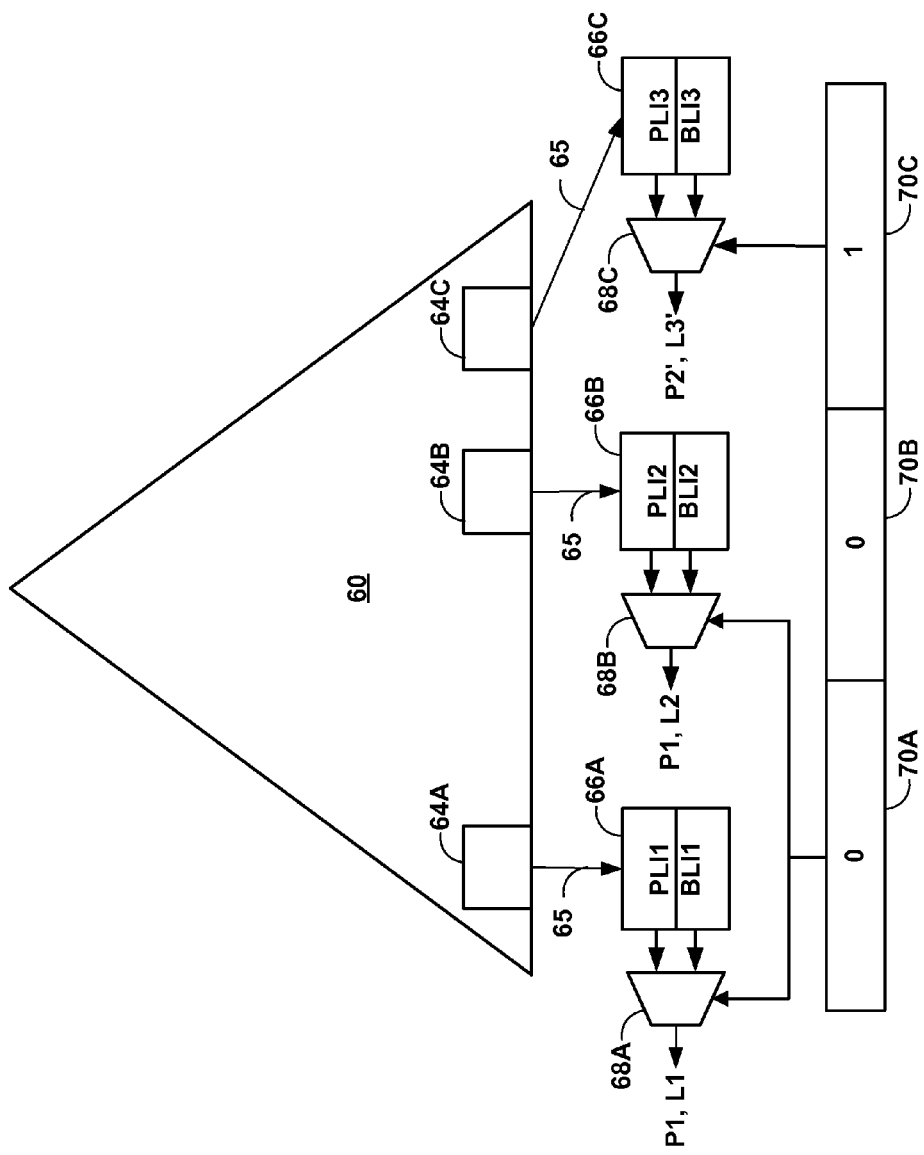
FIG. 4 is a block diagram illustrating exemplary structures in which a forwarding information base (FIB) is maintained in hardware of an ASIC by a packet-forwarding engine of a network device.

FIG. 3 is a block diagram illustrating various exemplary aspects of forwarding plane 32B in implementing the aggregated bundle scheduling techniques described in this disclosure. The example of FIG. 3 shows LC 36A of forwarding plane 32B to include two PFEs, denoted PFE 38' and 38", while LC 36A is shown to include a single PFE, denoted PFE 38'''. PFE 38' includes a control unit 50 that may be similar to control unit 30 in terms of implementation. Control unit 50 may interface with control unit 30 to receive and store software FIB 45'. ASICs 54 are microcode-controlled chipsets programmably configured by control unit 50 executing on each of PFEs 38 (including PFEs 38', 38" and 38'''). While described in this disclosure with respect to ASICs 54, the techniques may be implemented by other forms of hardware, such as one or more network processors, or any combination of hardware and software.

Specifically, one or more of ASICs 54 is controllable by microcode 57 programmed by control unit 50. Control unit 50 programs a hardware (HW) FIB 56 ("HW FIB 56") into internal memory of ASICs 54 based on software FIB 45'. When forwarding packets, control logic 56 locates HW FIB 56 and, upon reaching a FIB entry for the packet (e.g., a leaf node), microcode-implemented control logic 56 automatically selects either a primary forwarding next hop (FNH) or a backup FNH for forwarding the packet to either a primary logical interface or one of the one or more backup logical interfaces based on a value output by one of selector blocks 59 associated with the entry (e.g., the value may be represented by a signal). Control unit 50 monitors the status of links associated with router 20, and programs the selector blocks 59 to reflect any change in the status of a physical link. The interaction between control unit 50, control logic 56, and HW FIB 56 is described in further detail below with respect to FIG. 4.

Although not shown in the example of FIG. 3 for ease of illustration purposes, PFEs 38" and 38''' may be substantially similar to PFE 38' in terms of including a control unit 50, SW FIB 45' and ASICS 54 and may perform similar operations to those described above for forwarding traffic (e.g., packets) internally or within router 18 to other PFEs 38. ASICS 54 of PFE 38" includes a primary logical interface 52A for which primary scheduling module 21A has been configured in the manner described above, while PFE 38''' includes a backup logical interface 52B for which backup scheduling module 21B has been configured in the manner described above. PFE 38' may include similar logical interfaces, including both primary and backup logical interfaces to those shown in the example of FIG. 3 with respect to PFEs 38" and 38'''.

In other words, different aspects of PFEs 38' and PFEs 38" and 38''' have been shown for ease of illustration purposes. Yet, PFEs 38', 38" and 38''' may include components, modules or units that perform any of the operations described with respect to any one of PFEs 38', 38" and 38'''. The techniques therefore should not be limited to the simplified version of PFEs 38', 38" and 38''' shown in the example of FIG. 3. Generally, PFE 38' represents the internal forwarding aspects of PFEs 38, where PFE 38' resolves internal next hops specified in HW FIB 56 to which packets should be forwarded based on the value output from selector blocks 59. PFE 38" represents the primary scheduling aspects of PFEs 38 that implement the techniques described in this disclosure, while PFE 38' represents the backup scheduling aspects of PFEs 38 that implement the techniques described in this disclosure. Thus, while only various aspects are described with respect to PFEs 38', 38" and 38''', each of PFEs 38 (including PFEs 38', 38" and 38''') may implement one or more of aspects described with respect to other ones of PFEs 38', 38" and 38'''.

In any event, after the ASICs 54 are programmed with HW FIBs 56 and primary logical interface 52A and backup logical interface 52B are configured, PFE 38' may receive inbound traffic destined for the one of subscriber networks 16 associated with primary logical interface 52A and backup logical interface 52B. PFE 38' references HW FIB 56 using the five-tuple of the packet as a key to obtain a next hop for the packet, and forwards the packet to the one of PFEs 38' and 38" indicated by the next hop. Based on HW FIB 56 and the state of corresponding selector block 59, ASICs 54 will automatically forward the packet to either primary logical interface 52A configured within PFE 38" of first line card 36A or backup logical interface 52B of PFE 38''' of a second different line card 36N. In this manner, packets are transmitted internally to either primary logical interface 52A or backup logical interface 52B. One example of a router including a packet processing engine having multiple microcode instruction memories is described in U.S. Pat. No. 6,976,154, the entire contents of which are incorporated herein by reference.

If sent to primary logical interface 52A, primary logical interface 52A invokes primary scheduling module 21A, which schedules the packet in a manner that generally provides an agreed-upon class of service. Primary scheduling module 21A may schedule this packet in accordance with any of the weighted fair queuing algorithms described above. In the event primary logical interface 52A is unavailable due to some failure associated with the link, PFE 38" or LC 36A to which primary logical interface 52A is associated, control logic 56 may forward the packet internally via switch fabric 34 to backup logical interface 52B of LC 36N. Backup logical interface 52B may invoke backup scheduling module 21B, which implements any one or more of the weighted fair queuing scheduling algorithms described above to schedule the packet for delivery downstream to the corresponding one of subscriber networks 16. Regardless, one of interfaces 51 associated with PFE 38" or PFE 38''' transmits this packet downstream via one of the links of aggregated bundle 22.

Also, although not shown in the example of FIG. 3, control unit 30 may configure another one of LCs 36 to provide a failsafe scheduling module similar in operation to backup scheduling module 21B, which acts as a subscriber independent scheduling module should primary logical interface 52A and backup logical interface 52B fail. This failsafe scheduling module may represent another next hop that is selected in a manner similar to that described below with respect to the example of FIG. 4. Alternatively, upon determining that both primary logical interface 52A and backup logical interface 52B have failed, PFEs 38 may be configured to send all packets to subscriber networks 16 for which all of their primary and backup logical interfaces have failed to this failsafe scheduling module.

While the example provided in FIG. 3 illustrating FNH selection with respect to unicast traffic, the techniques may be implemented with respect to FNH selection implemented when forwarding multicast traffic, such as IPTV traffic. FNH selection implemented when forwarding multicast traffic may involve replication and other related multicast operations to ensure the traffic is delivered to one or more subscribers that have joined the multicast group associated with the multicast traffic. In these instances, the techniques may be implemented to similarly update the multicast FNH structure. Likewise, the techniques should not be limited to scheduling of IP traffic but may be performed with respect to other forms of traffic, such as multi-protocol label switching (MPLS) traffic.

FIG. 4 is a block diagram illustrating exemplary structures in which a forwarding information base (FIB) 60 is maintained in hardware of an ASIC by a packet-forwarding engine of a router such as router 18 of FIGS. 1 and 2. In the example of FIG. 4, FIB 60 is arranged as a tree having route resolution leaf nodes 64A-64C that resolve forwarding labels to next hops. Specifically, in the embodiment of FIG. 4, leaf nodes 64A-64C include pointers 65A-65C referencing separate data structures that include forwarding next hop lists 66A-66C ("forwarding next hop lists 66") that list primary/backup next hop pairs. The pointers may comprise indirect next hop data as described in "Network Routing Using Indirect Next Hop Data," U.S. application Ser. No. 10/045,717, filed Oct. 19, 2001, the entire content of which is incorporated herein by reference. The arrangement of FIB 60, or a portion thereof, as a tree is illustrated for exemplary purposes. The techniques described in this disclosure may readily be applied to other arrangements. FIB 60 may be arranged, for example, as a number of tables, hash tables, link lists, and other data structures.

Upon receiving a packet on an input interface port at one of PFEs 38, control logic 56 reads a block of data, referred to as a key, from the packet. The key may, for example, comprise the above described five-tuple. Control logic 56 resolves the key to one of the leaf nodes of FIB 60, e.g., leaf node 64A, by sequentially testing bits within the key, e.g., bits A, B and C, that represent any bits within the block of data. Based on the value of each bit, control logic 56 follows the links of FIB 60 through the various levels until reaching one of the leaf nodes to identify a forwarding next hop list 66A associated with the key.

Upon identifying a respective leaf node, a pointer 65 directs control logic 56 to one of forwarding next hop lists 66A-66C ("FNH lists 66"), e.g., FNH list 66A. Each of the FNH lists 66 includes multiple entries, one for the primary FNH that specifies a primary logical interface (such as primary logical interface 52A shown in the example of FIG. 3), and one for the backup FNH that specifies a backup logical interface (such as backup logical interface 52B shown in the example of FIG. 3) (and any additional backup logical interfaces, where these additional backup logical interfaces may be grouped into a single FNH and the failsafe). For example, leaf node 64A includes a pointer 65 to FNH list 66A, which specifies a primary forwarding next hop of backup logical interface one (BLI1). FNH list 66A further specifies a backup logical interface one (BLI1).

The leaf nodes 64 may also include pointers (not shown) to one of selector blocks 70A-70C ("selector blocks 70"). Selector blocks 70 are data memory locations that indicate the status of the links associated an aggregated bundle, such as aggregated bundle 22 shown in the example of FIG. 1. All FNH lists 66 having the same combination of primary interface port and backup interface port may share a corresponding selector block 70 that indicates whether to select the link associated with that primary interface port or the backup interface port. The selector blocks 70 consist of blocks of memory (e.g., one bit blocks) that indicate whether to select the link associated with the primary interface port (e.g., when the primary link is active) or the backup interface port (e.g., when the primary link has failed). More information regarding how the forwarding plane may be adapted to utilize primary and backup forwarding next hops can be found in U.S. application Ser. No. 12/391,859, entitled "Fast Reroute for Multiple Label Switched Paths Sharing a Single Interface," filed Feb. 24, 2009, the entire contents of which are hereby incorporated by reference as if set forth in their entirety.

While the above referenced U.S. patent application Ser. No. 12/391,859 restricts its techniques to those LSPs that share a single interface, the these techniques may be adapted in the manner described in this disclosure so that control unit 30 detects failures using the one or more connectivity fault management (CFM) protocols described above or any other suitable failure detection mechanism that may detect failures associate with a logical interface. Control unit 30 may then interface with PFEs 38 via dedicated communication link 50 to configure PFEs 38 to select the forwarding next hop that specifies the backup scheduling modules of those primary scheduling modules impacted by the failure. In addition, while not shown in the example of FIG. 4, there may be additional forwarding next hops associated with each of the forwarding next hop pairs that specify the primary and backup scheduling modules. These additional forwarding next hops may specify further backup scheduling modules or the failsafe scheduling module. Typically, at least one additional next hop is associated with each of the next hops specifying primary and backup scheduling modules, which specifies the failsafe scheduling module. The techniques described in this disclosure should therefore not be limited to the example of FIG. 4, but may include additional forwarding next hops that may be selected should the primary and backup scheduling modules both concurrently fail.

Figure 5:
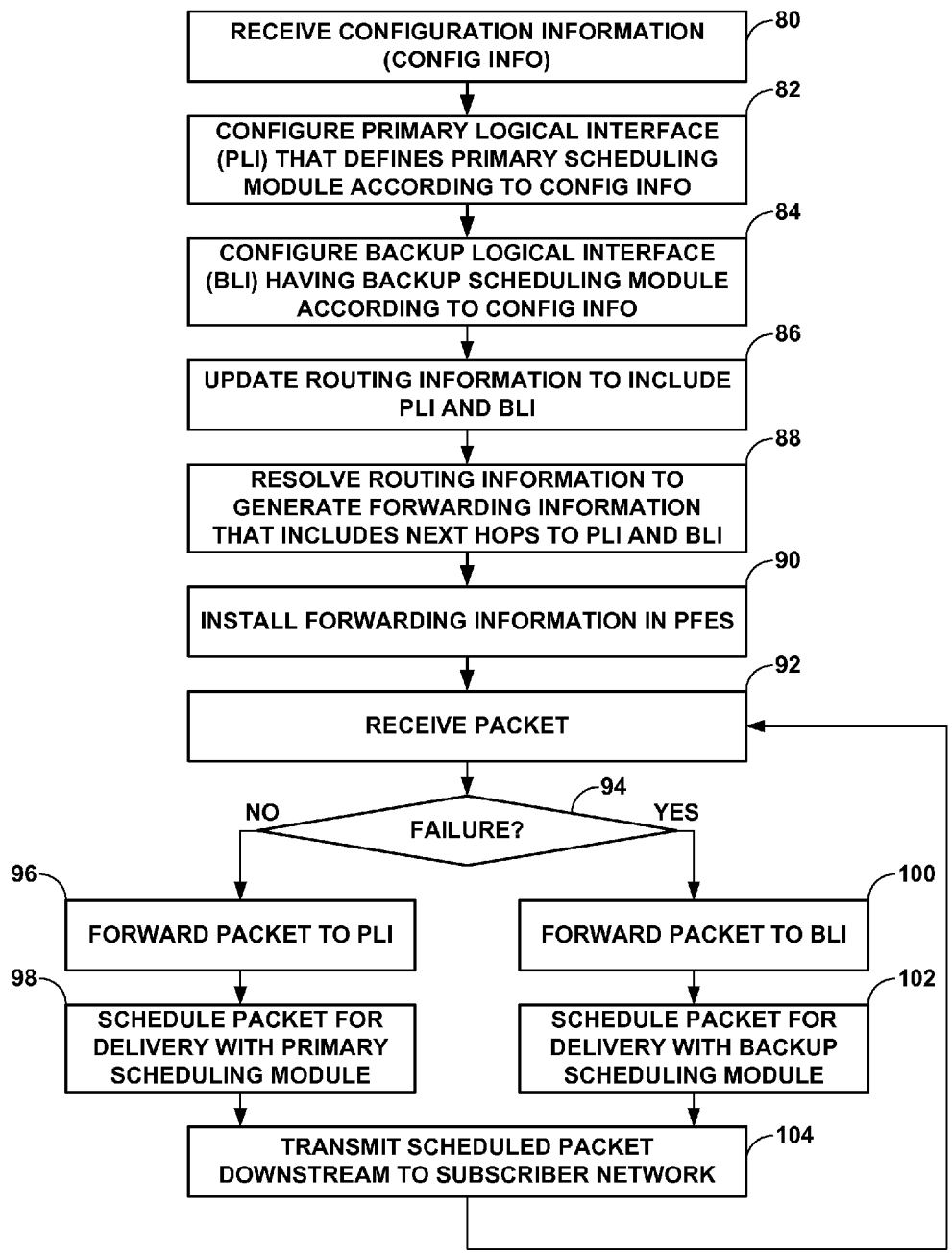
FIG. 5 is a flowchart illustrating an example mode of operation of a network device in implementing the aggregated bundle scheduling techniques described in this disclosure.

FIG. 5 is a flowchart illustrating an example mode of operation of a network device, such as router 18 shown in the examples of FIGS. 2 and 3, in implementing the aggregated bundle scheduling techniques described in this disclosure. Initially, a user or administrator may interface with router 18 via UI 46 to specify configuration data 48 for configuring primary logical interface 52A and backup logical interface 52B (80). Control unit 30 may interface with PFEs 38, such as PFE 38''', to configure primary logical interface (PLI) 52A within PFE 38'' that defines primary scheduling module 21A according to configuration data 48 in the manner described above (82). Control unit 30 may interface with PFEs 38, such as PFE 38''', to configure backup logical interface (BLI) 52B within PFE 38''' that defines backup scheduling module 21B according to configuration data 48 also as described above (84). Control unit 30 may configure this backup logical interface 52B prior to detection of a fault or failure impacting operation of primary logical interface 52A. Control unit 30 may invoke RE 43 to update the routing information stored to RIB 44 to include primary logical interface 52A and backup logical interface 52B (86). RE 43 may then, as described above, resolve this updated routing information to generate forwarding information that includes next hops to primary logical interface 52A and backup logical interface 52B (88).

After generating this forwarding information, RE 43 stores this forwarding information to FIB 45. Control unit 30 then installs this forwarding information in PFEs 38 as SW FIB 45' (90). PFEs 38 may then install this SW FIB 45' into hardware to generate HW FIB 56 in the manner described above. PFEs 38 may then begin receiving downstream traffic destined to the subscriber for which primary logical interface 52A and backup logical interface 52B were created (92). For example, PFE 38' may receive a packet destined for the one of subscriber networks 16 owned and operated by this subscriber and associated with primary logical interface 52A and backup logical interface 52B.

Next, control logic 56 may then extract a five-tuple from this packet and perform a lookup in HW FIB 56 in the manner described above with respect to the example of FIG. 4 to determine the primary and backup next hop. Control logic 56 may then identify one of selector blocks 59 associated with the interface identified by the primary next hop, i.e., primary logical interface 52A in this example, to determine whether this interface has failed (94). If primary logical interface 52A has not failed ("NO" 94), PFE 38' forwards the packet to primary logical interface 52A of PFE 38'', where the packet is scheduled for delivery with primary scheduling module 21A of primary logical interface 52A (96, 98). However, if the interface has failed ("YES" 94), as indicated by a corresponding one of selector blocks 59, control logic 56 forwards the packet via switch fabric 34 to backup logical interface 52B of PFE 38''', where the packet is scheduled for delivery with backup scheduling module 21B of backup logical interface 52B (100, 102).

In some instances, control logic 56 may perform another failure check prior to sending this packet to backup logical interface 52B, where this failure check may determine whether backup logical interface 52B has failed. If this backup logical interface 52B has failed, control logic 56 may send the packet to the above noted failsafe scheduling module, which schedules the packet for transmission downstream via one of the active links of the aggregated bundle. Regardless, one of interfaces 52 transmits the scheduled traffic downstream to the one of subscriber networks 16 to which the packet is destined (104).

In some instances, control logic 56 may, upon sending the packet to the above noted failsafe scheduling module, re-provision or re-configures another primary and/or backup logical interface for the subscriber on line cards and/or chassis that have not failed. Control logic 56 may then send future packets to one of the re-provisioned primary and/or backup logical interfaces rather than continue to send these packets to the failsafe scheduling module until either the provisioned primary or backup logical interfaces once again become operational.

Typically, when configuring primary logical interface and backup logical interfaces for subscribers, control unit 30 either configures these interfaces in a targeted manner such that certain subscribers are associated with certain links of aggregated bundle 22 or in a distributed manner (using, for example, a hash function) such that certain subscribers are randomly distributed to various links of aggregated bundle 22. The techniques described in this disclosure may also permit configuration of some of these interfaces in the targeted manner, while other interfaces may be configured in the hashed or distributed manner. In this respect, the techniques enable control unit 30 to configure the interfaces concurrently in both the targeted and distributed manner.

Whether targeted or random, control unit 30 typically ensures that the interfaces are distributed in an approximately even manner (in terms of the number of subscribers, such that bandwidth consumption or provisioned bandwidth is approximately equal over the links of aggregated bundle 22 or any combination of the foregoing). Over time, however, as the number of active subscribers change, subscribers bandwidth habits change or some combination of the foregoing, either with the addition of people or in requesting different types of traffic (such as might occur when online video viewing habits change), the distribution of subscribers or subscriber traffic over the links of aggregated bundle 22 may change such that either the number of subscribers or subscriber bandwidth consumption over the links becomes unbalanced with respect to one another. In these instances, an administrator may interface a rebalance command via UI 46 in accordance with the following command syntax:

request interface rebalance <interface-name>

Using this command, the administrator may specify an interface rebalance by specifying the interface name assigned to aggregated bundle 22. Alternatively, the administrator may configure a periodic rebalance using the following command specified in accordance with the following exemplary command syntax:

```
ae0 {
  aggregated-ether-options {
    rebalance-periodic start-time <hh:mm> interval <hours>
  }
}
```

In this example, the administrator specifies the aggregated bundle using its identifier (i.e., ae0 in this example) and specifying an aggregated Ethernet bundle option (i.e., aggregated-ether-options in this example) and then defining a rebalance periodic option (i.e., rebalance periodic in this example) and specifying a start time in hours and minutes and interval in hours. This rebalance command may cause control unit 30 to rearrange the distribution of primary logical interfaces and backup logical interfaces with respect to PFEs 38.

Figure 6:
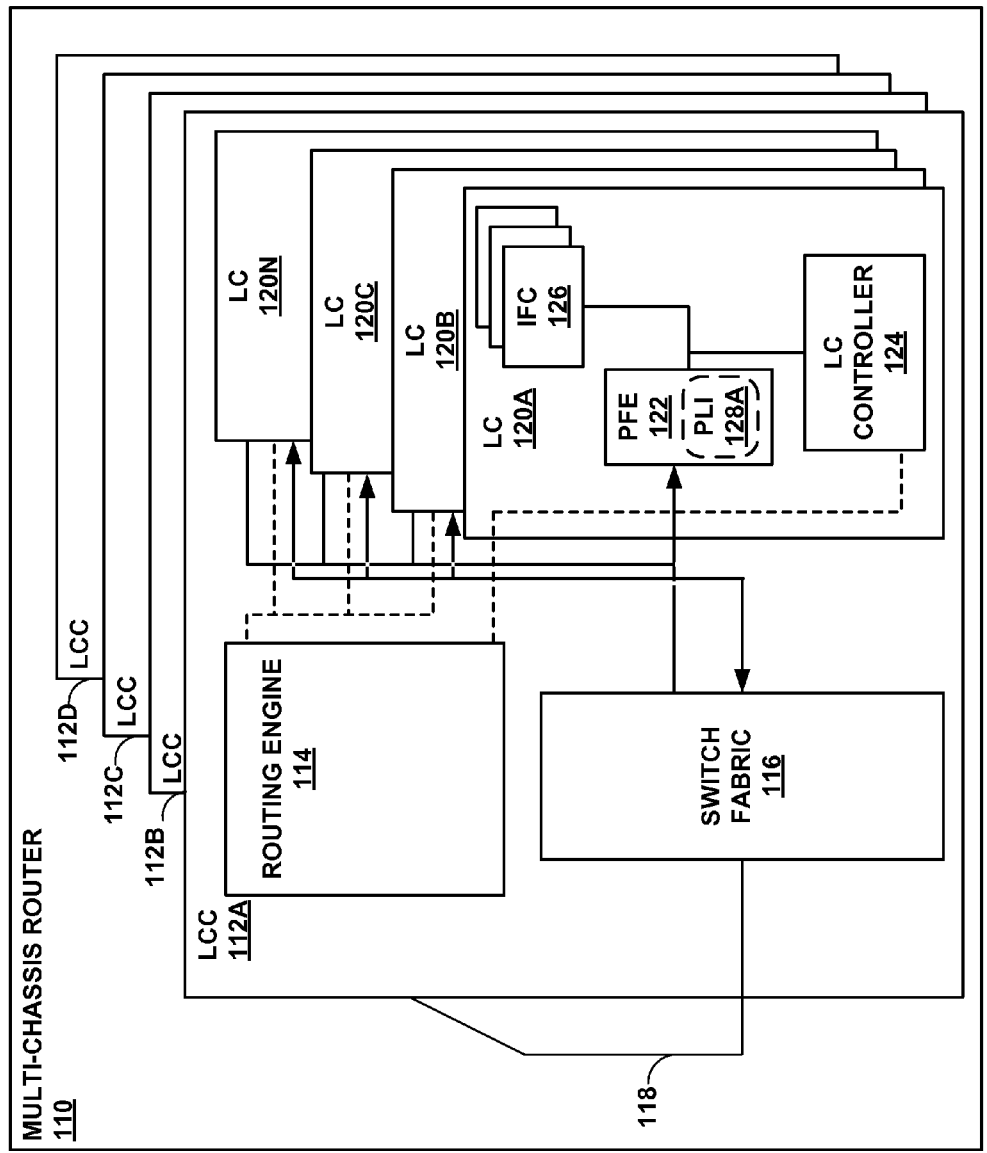
FIG. 6 is a block diagram illustrating an example multi-chassis router that implements the aggregated bundle scheduling techniques described in this disclosure.

FIG. 6 is a block diagram illustrating an example multi-chassis router 110 that implements the aggregated bundle scheduling techniques described in this disclosure. In the example of FIG. 6, multi-chassis router 110 may include a plurality of line card chassis (LCC) 112A-112D ("LCCs 112"). Each of LCCs 112 includes a routing engine 114, which may operate in a manner similar to that described above with respect to RE 43 of router 18 shown in the example of FIG. 2. Each LCC 112 also includes a switch fabric 116, which may also function within each of LCCs 112 similar to that described above with respect to switch fabric 34 of router 18 shown in the example of FIG. 2. However, switch fabric 116 may be adapted to enable communication not only within each of LLCs 112, but also between LLCs 112 via inter-chassis switch fabric 118. Inter-chassis switch fabric 118 represents a switch fabric that may be integrated with or separate from switch fabric 116 that enables switching of traffic among LCCs 112, hence the name "inter-chassis switch fabric."

Each of LCCs 112 also include a plurality of LCs 120A-120N ("LCs 120"), which may operate in a manner similar to that of LCs 36 of router 18 shown in the example of FIG. 2. Each of LCs 120 may, similar to LCs 36, include a PFE 122 (which may be similar to PFEs 38), an LC controller 124 (which may operate similar to control logic 56 and may include selector blocks 59) and one or more interface cards (IFC) 126 ("IFCs 126," which may be similar to interfaces 51). While not shown in the example of FIG. 6, multi-chassis router 110 may include a multi-chassis central control or management module that may ensure routing engines 114 included within LCCs 112 are synchronized or otherwise operating on the same set of routing data. This management module may comprise a control unit similar to control unit 30 of router 18 that may distribute routing information received by multi-chassis router 110 to each of routing engines 114. This multi-chassis management or control module may act as a single point of presence for routing and other control protocols, such as CFM protocols, distributing the routing and other control information (such as failure detection) to LCCs 112.

In the example of FIG. 6, PFE 122 of LC 120A included within LCC 112A includes a primary logical interface (PLI) 128A ("PLI 128A"), which may be substantially similar to primary logical interface 52A described above with respect to the example of FIG. 3. In this example, the multi-chassis management module may distribute PLI 128A to LCC 112A but configure backup logical interface (BLI) 128B (which is not shown in the example of FIG. 6 for ease of illustration purposes) to another different one of LCCs 112 (such as LCC 112B, 112C or 112D in the example of FIG. 6) from that on which PLI 128A is configured. The techniques may therefore be implemented in a multi-chassis router, such as multi-chassis router 110, to distribute PLI 128A on a first chassis of multi-chassis router 110, such as LCC 112A, and BLI 128B on a second chassis different from the first chassis of multi-chassis router 110, such as any one of LCCs 112B-112D. As noted above, the distribution of PLI 128A and BLI 128B may be targeted or random (such as by way of a hash function).

In this way, the subscriber may be evenly distributed over the aggregated bundle of links, such as aggregated bundle 22, to prevent uneven distribution of subscribers that may lead to wasted use of bandwidth (on those links to which less subscribers are associated) and dropped traffic (on those links to which more subscribers are associated), leading to a degradation of service for these subscribers while others experience service that may far exceed their agreed-upon class of service.

While multi-chassis router 110 may represent a single concentrated routing device, multi-chassis router 110 may represent a distributed router 110 in which the various chassis of router 110 may be dispersed among many different routers. In these instances, switch fabric 116 may be replaced with a network connection that interconnects the dispersed chassis, operating in a sense as a virtual switch fabric. These chassis may be virtualized or physical chassis in the sense that physical chassis may be present within a concentrated multi-chassis router or virtualized when various dispersed router chassis are interconnected to form a virtual multi-chassis router. The techniques may be implemented with respect to either of these forms of multi-chassis routers. Virtual multi-chassis routers may promote further forms of redundancy as the virtual chassis may be dispersed geographically, thereby enabling persistent connectivity despite local geographical issues, such as power outages, earthquakes, hurricanes and other issues that may impact one geographical area and not another.

In this manner, the techniques may allow for pre-configured class-of-service parameters on alternate links of aggregated bundle 22. As noted above, selection of these backup links is configurable such that a backup may be selected in one of three ways for prevention of single-point-of-failure: 1) select a backup on a separate link, 2) select a backup on a separate line card, protecting against line card failures and 3) select a backup on a separate chassis in a multi-chassis system, protecting against chassis failures.

In addition, the techniques facilitate utilization of the increased bandwidth offered by use of aggregated bundle 22 in that the techniques enable initial even or near even distribution of primary link assignments for the logical interfaces across the links of aggregated bundle 22 as these links are added to the system. The techniques may also promote initial even or near even distribution of the backup links while maintaining the different line, line card, or chassis configurable requirement noted above. As time progresses, the distribution of primary and backup links may become unbalanced or uneven, as certain subscribers utilize more bandwidth than other subscribers over time. The techniques may facilitate re-balancing by providing the above noted re-balance command to re-distribute the logical interfaces (both primary and backup) evenly again. An administrator or other user may invoke this command as a one-time event or configure execution of this command on a periodic basis.

Moreover, the techniques may promote accurate allocation of resources to achieve potentially more accurate class-of-service scheduling as allocation of resources may be applied upon receipt of data flows. The techniques may enable router 18 to detect on which port or, in some instances, ports ingress data flows for a logical interface from an external device are arriving. The techniques may enable router 18 to then dynamically assign class of service scheduling resources to those ports. Should the external device also guarantee that data flows for a single logical interface will be sent over a single port, the class-of-service parameters can be configured to be the full value, thus guaranteeing accurate application of class-of-service parameters used in performing class-of-service scheduling on ingress as well.

Various embodiments of the invention have been described. These and other embodiments are within the scope of the following claims.

The invention claimed is:

1. A method comprising:
configuring, with a control plane of a router, a plurality of primary logical interfaces within a forwarding plane of the router and for a plurality of subscribers of one or more services provided by a service provider network over an aggregated bundle of two or more links such that each of the plurality of primary logical interfaces is associated with a respective first primary link of the aggregated bundle of two or more links,
wherein each of the primary logical interfaces is configured to be associated with a respective primary scheduling module that schedules traffic associated with a subscriber of the plurality of subscribers for delivery downstream to the corresponding subscriber via the respective first primary link of the aggregated bundle of two or more links; and
prior to detecting a failure associated with the corresponding primary scheduling module, configuring, with the control plane, a plurality of backup logical interfaces within the forwarding plane and for the corresponding subscriber of the plurality of subscribers such that each of the backup logical interfaces is associated with a respective second backup link of the aggregated bundle of two or more links and provides redundancy of connection over the aggregate bundle in the event of a failure associated with the corresponding primary scheduling module and permit the traffic associated with the subscriber to be forwarded despite the failure associated with the corresponding primary scheduling module,
wherein each of the backup logical interfaces is configured to be associated with a backup scheduling module that schedules, in response to detecting the failure associated with the primary scheduling module, the traffic associated with the corresponding subscriber for delivery downstream to the corresponding subscriber via the respective second backup link of the aggregated bundle of two or more links, and
wherein the plurality of primary logical interfaces and the plurality of backup logical interfaces are configured for each of the plurality of subscribers to be evenly distributed over the aggregated bundle of two or more links.

2. The method of claim 1, further comprising:
scheduling the traffic associated with the subscriber with the corresponding configured primary scheduling module;
detecting the failure associated with the corresponding first primary scheduling module;
in response to detecting the failure, scheduling the traffic associated with the subscriber with the corresponding configured backup scheduling module; and
transmitting, with at least one interface of the router, the scheduled traffic downstream to the subscriber.

3. The method of claim 2,
wherein the traffic associated with the subscriber comprises first traffic associated with a first service to which a service provider has agreed to provide to the subscriber at a first class of service and second traffic associated with a second service to which the service provider has agreed to provide to the subscriber at a second class of service,
wherein the first class of service is different than the second class of service,
wherein scheduling the traffic associated with the subscriber with the corresponding configured primary scheduling module comprises scheduling the first traffic and the second traffic with the corresponding configured primary scheduling module such that the first traffic and the second traffic is delivered via the respective first primary link of the aggregated bundle of two or more links to the subscriber in a manner that adheres to the first class of service and the second class of service to which the service provider has agreed to provide with respect to the first service and the second service, and
wherein scheduling the traffic associated with the subscriber with the corresponding configured backup scheduling module comprises, in response to detecting the failure, scheduling the first traffic and the second traffic with the corresponding configured backup scheduling module such that the first traffic and the second traffic is delivered via the corresponding second backup link of the aggregated bundle of two or more links to the subscriber in a manner that adheres to the first class of service and the second class of service to which the service provider has agreed to provide with respect to the first service and the second service.

4. The method of claim 2, wherein detecting the failure with the control plane comprises executing one or more connectivity fault management protocols with the control plane to detect the failure with respect to the respective first primary link.

5. The method of claim 1,
wherein configuring the primary scheduling module comprises configuring the primary scheduling module within a first line card of the router,
wherein configuring the backup scheduling module comprises configuring the backup scheduling module within a second line card of the router prior to detecting the failure of the corresponding primary scheduling module, and
wherein the first line card is different than the second line card.

6. The method of claim 1,
wherein configuring the primary scheduling module comprises configuring the primary scheduling module within a first chassis of the router,
wherein configuring the backup scheduling module comprises configuring the backup scheduling module within a second chassis of the router prior to detecting the failure of the corresponding primary scheduling module, and
wherein the first chassis is different than the second chassis.

7. The method of claim 1, further comprising:
configuring, with the control plane of the router, a fail-safe scheduling module prior to detecting a concurrent failure of both the primary scheduling module and the corresponding backup scheduling module,
wherein the fail-safe scheduling module schedules the traffic associated with the subscriber for delivery downstream to the subscriber via one of the links of the aggregated bundle of two or more links in response to the control plane detecting the concurrent failure with respect to the respective first primary scheduling module and the respective backup scheduling module,
wherein the same fail-safe scheduling module is configured for use by the subscriber and any other of the plurality of subscribers for which the control plane detects a concurrent failure of the corresponding one of the plurality of primary scheduling modules and the corresponding one of the plurality of backup scheduling modules configured for the any other plurality of subscribers;
detecting the concurrent failure of both the configured primary scheduling module and the configured backup scheduling module; and
in response to detecting the concurrent failure, scheduling the traffic associated with the subscriber with the configured fail-safe scheduling module.

8. The method of claim 7, further comprising:
after detecting the concurrent failure of both the configured primary scheduling unit and the corresponding configured backup scheduling unit, re-configuring at least one of the primary scheduling module and the corresponding backup scheduling module; and scheduling the traffic not currently scheduled by the fail-safe scheduling module with the re-configured at least one of the primary scheduling module and the corresponding backup scheduling module.

9. The method of claim 1, further comprising:
adding each of the plurality of primary logical interfaces and the plurality of backup logical interfaces to routing information stored by a routing engine executing within an operating environment provided by the control plane; and
resolving the routing information with the routing engine to generate forwarding information that includes a plurality of primary next hops and a plurality of backup next hops,
wherein each of the plurality of primary next hops indicates that the traffic associated with the subscriber is to be sent to a corresponding one of the plurality of primary logical interfaces, and
wherein each of the backup next hops indicates that traffic destined for the subscriber is to be sent to a corresponding one of the plurality of backup logical interfaces.

10. The method of claim 9, further comprising:
installing the forwarding information within at least one of a plurality of line cards of the router;
receiving the traffic associated with the subscriber with the at least one of the plurality of line cards;
accessing the forwarding information with the at least one of the plurality of line cards to identify a primary next hop of the plurality of primary next hops and a backup next hop of the plurality of backup next hops;
selecting one of the primary next hop and the backup next hop based on whether the control plane has detected the failure; and
forwarding the received traffic to the corresponding one of the plurality of primary logical interfaces and the corresponding one of the plurality of backup logical interfaces based on the selection of the one of the primary next hop and the backup next hop.

11. The method of claim 1, further comprising:
presenting a user interface with the control plane by which to receive a rebalance command;
receiving the rebalance command via the user interface; and
in response to receiving the rebalance command, rebalancing the distribution of both the plurality of primary scheduling modules and the plurality of backup scheduling modules to once again evenly distribute the plurality of primary scheduling modules and the plurality of backup scheduling modules across the two or more links of the aggregate bundle of two or more links.

12. The method of claim 11,
wherein the rebalance command comprises a periodic rebalance command that specifies a frequency with which to rebalance the distribution of both the plurality of primary scheduling modules and the plurality of backup scheduling modules, and
wherein rebalancing the distribution of both the plurality of primary scheduling modules and the plurality of backup scheduling modules comprises rebalancing the distribution of both the plurality of primary scheduling modules and the plurality of backup scheduling modules in accordance with the defined frequency.

13. A router comprising:
a control plane that configures a plurality of primary logical interfaces within a forwarding plane of the router for a plurality of subscribers of one or more services provided by a service provider network over an aggregated bundle of two or more links such that each of the plurality of primary logical interfaces is associated with a respective first primary link of the aggregated bundle of two or more links, wherein each of the plurality of primary logical interfaces is configured to be associated with a primary scheduling module that schedules traffic associated with a subscriber of the plurality of subscribers for delivery downstream to the subscriber via the respective first primary link of the aggregated bundle of two or more links, wherein the control plane further, prior to detecting a failure associated with the primary scheduling module, configures a plurality of backup logical interfaces within the forwarding plane of the router and for the plurality of subscribers such that the backup logical interface is associated with a respective second backup link of the aggregated bundle of two or more links and provides redundancy of connection over the aggregate bundle in the event of a failure associated with the corresponding primary scheduling module and permit the traffic associated with the subscriber to be forwarded despite the failure associated with the corresponding primary scheduling module, wherein each of the plurality of backup logical interfaces is configured to be associated with a backup scheduling module that schedules, in response to detecting the failure associated with the corresponding primary scheduling module, the traffic associated with the subscriber for delivery downstream to the subscriber via the respective second backup link of the aggregated bundle of two or more links, and wherein the control plane configures the plurality of primary logical interfaces and the plurality of backup logical interfaces for each of the plurality of subscribers to be evenly distributed over the aggregated bundle of two or more links.

14. The router of claim 1, wherein the corresponding configured primary scheduling module schedules the traffic associated with the subscriber, wherein the control plane detects the failure associated with the corresponding primary scheduling module, wherein the corresponding configured backup scheduling module, in response to detecting the failure, schedules the traffic associated with the subscriber, and wherein the router further includes at least one interface that transmits the scheduled traffic downstream to the subscriber.

15. The router of claim 14, wherein the traffic associated with the subscriber comprises first traffic associated with a first service to which a service provider has agreed to provide to the subscriber at a first class of service and second traffic associated with a second service to which the service provider has agreed to provide to the subscriber at a second class of service, wherein the first class of service is different than the second class of service, wherein the corresponding configured primary scheduling module schedules the first traffic and the second traffic such that the first traffic and the second traffic is delivered via the respective first primary link of the aggregated bundle of two or more links to the subscriber in a manner that adheres to the first class of service and the second class of service to which the service provider has agreed to provide with respect to the first service and the second service, and wherein the corresponding configured backup scheduling module, in response to detecting the failure, schedules the first traffic and the second traffic such that the first traffic and the second traffic is delivered via the respective second backup link of the aggregated bundle of two or more links to the subscriber in a manner that adheres to the first class of service and the second class of service to which the service provider has agreed to provide with respect to the first service and the second service.

16. The router of claim 14, wherein the control plane includes a connectivity fault management module that detects the failure with respect to the respective first primary link.

17. The router of claim 13, wherein the control plane configures the primary scheduling module within a first line card of the router and configures the corresponding backup scheduling module within a second line card of the router prior to detecting the failure of the corresponding primary scheduling module, and wherein the first line card is different than the second line card.

18. The network device router of claim 13, wherein the control plane configures the primary scheduling module within a first chassis of the router and configures the corresponding backup scheduling module within a second chassis of the router prior to detecting the failure of the corresponding primary scheduling module, and wherein the first chassis is different than the second chassis.

19. The router of claim 13, wherein the control plane further configures a fail-safe scheduling module prior to detecting a concurrent failure of both the primary scheduling module and the corresponding backup scheduling module, wherein the fail-safe scheduling module schedules the traffic associated with the subscriber for delivery downstream to the subscriber via one of the links of the aggregated bundle of two or more links in response to the control plane detecting the concurrent failure with respect to the first primary link and the corresponding backup scheduling module, wherein the same fail-safe scheduling module is configured for use by the subscriber and any other of the plurality of subscribers for which the control plane detects a concurrent failure of the corresponding one of the plurality of primary scheduling modules and the corresponding one of the plurality of backup scheduling modules configured for the any other plurality of subscribers, wherein the control plane detects the concurrent failure of both the configured primary scheduling unit and the corresponding configured backup scheduling unit, and wherein the fail-safe scheduling module, in response to detecting the concurrent failure, schedules the traffic associated with the subscriber with the configured fail-safe scheduling module.

20. The router of claim 19, wherein the control plane further, after detecting the concurrent failure of both the configured primary scheduling unit and the corresponding configured backup scheduling unit, re-configures at least one of the primary scheduling unit and the corresponding backup scheduling unit, and wherein the re-provisioned at least one of the primary scheduling unit and the corresponding backup scheduling unit schedules the traffic not currently scheduled by the fail-safe scheduling module with the re-provisioned at least one of the primary scheduling unit and the corresponding backup scheduling unit.

21. The router of claim 13,
wherein the control plane includes a routing engine that adds the plurality of primary logical interfaces and the plurality of backup logical interfaces to routing information, resolves the routing information with the routing engine to generate forwarding information that includes a plurality of primary next hops and a plurality of backup next hops,
wherein each of the plurality of primary next hops indicates that the traffic associated with the subscriber is to be sent to the respective primary logical interface, and
wherein each of the plurality of backup next hops indicates that traffic destined for the subscriber is to be sent to the respective backup logical interface.

22. The router of claim 21,
wherein the routing engine installs the forwarding information within at least one of a plurality of line cards of the router,
wherein the router further includes a plurality of line cards that receive the traffic associated with the subscriber, access the forwarding information to identify a primary next hop of the plurality of primary next hops and a backup next hop of the plurality of backup next hops, select one of the primary next hop and the backup next hop based on whether the control plane has detected the failure, and forwards the received traffic to a corresponding one of the plurality of primary logical interfaces and the plurality of backup logical interfaces based on the selection of the one of the primary next hop and the backup next hop.

23. The router of claim 13,
wherein the control plane includes a user interface module that presents a user interface with the control plane by which to receive a rebalance command, and
wherein the control plane, in response to receiving the rebalance command, rebalances the distribution of both the plurality of primary scheduling modules and the plurality of backup scheduling modules to once again evenly distribute the plurality of primary scheduling modules and the plurality of backup scheduling modules across the two or more links of the aggregate bundle of two or more links.

24. The router of claim 23,
wherein the rebalance command comprises a periodic rebalance command that specifies a frequency with which to rebalance the distribution of both the plurality of primary scheduling modules and the plurality of backup scheduling modules, and
wherein the control plane rebalances the distribution of both the plurality of primary scheduling modules and the plurality of backup scheduling modules in accordance with the defined frequency.

25. A non-transitory computer-readable medium comprising instructions that, when executed, cause one or more processors of a a control plane of a router to:
configure a plurality of primary logical interfaces within a forwarding plane of the router and for a plurality of subscribers of one or more services provided by a service provider network over an aggregated bundle of two or more links such that each of the plurality of primary logical interfaces is associated with a respective first primary link of the aggregated bundle of two or more links,
wherein each of the plurality of primary logical interfaces is configured to be associated with a primary scheduling module that schedules traffic associated with a subscriber of the plurality of subscribers for delivery downstream to the subscriber via the respective first primary link of the aggregated bundle of two or more links; and
prior to detecting a failure associated with the primary scheduling module, configure a plurality of backup logical interfaces within the forwarding plane of the router and for the plurality of subscribers such that the backup logical interface is associated with a respective second backup link of the aggregated bundle of two or more links,
wherein each of the backup logical interfaces is configured to be associated with a backup scheduling module that schedules, in response to detecting the failure associated with the corresponding primary scheduling module, the traffic associated with the subscriber for delivery downstream to the subscriber via the respective second backup link of the aggregated bundle of two or more links and provides redundancy of connection over the aggregate bundle in the event of a failure associated with the corresponding primary scheduling module and permit the traffic associated with the subscriber to be forwarded despite the failure associated with the corresponding primary scheduling module, and
wherein the plurality of primary logical interfaces and the plurality of backup logical interfaces are configured for each of the plurality of subscribers to be evenly distributed over the aggregated bundle of two or more links.

26. The non-transitory computer-readable medium of claim 25, further comprising instructions that, when executed, cause the one or more processors to:
configure the primary scheduling module within a first line card of the router; and
configure the corresponding backup scheduling module within a second line card of the router prior to detecting the failure of the corresponding primary scheduling module,
wherein the first line card is different than the second line card.

27. The non-transitory computer-readable medium of claim 25, further comprising instructions that, when executed, cause the one or more processors to:
configure the primary scheduling module within a first chassis of the router,
configure the corresponding backup scheduling module within a second chassis of the router prior to detecting the failure of the corresponding primary scheduling module, and
wherein the first chassis is different than the second chassis.

28. A method comprising:
configuring, with a control plane of a router, a primary logical interface of a plurality of primary logical interfaces within a forwarding plane of the router and to schedule traffic for delivery over an aggregated bundle of two or more links such that the primary logical interface is associated with a first primary link of the aggregated bundle of two or more links,
wherein the primary logical interface is configured to be associated with a primary scheduling module that schedules the traffic for delivery via the first primary link of the aggregated bundle of two or more links; and
prior to detecting a failure associated with the primary scheduling module, configuring, with the control plane, a backup logical interface of a plurality of backup logical interfaces within the forwarding plane of the router and such that the backup logical interface is associated with a second backup link of the aggregated bundle of two or more links and provides redundancy of connection over the aggregate bundle in the event of a failure associated with the corresponding primary scheduling module and permit the traffic to be forwarded despite the failure associated with the corresponding primary scheduling module, wherein the backup logical interface is configured to be associated with a backup scheduling module that schedules, in response to detecting the failure associated with the primary scheduling module, the traffic for delivery downstream via the second backup link of the aggregated bundle of two or more links, and wherein the plurality of primary logical interfaces and the plurality of backup logical interfaces are configured to be evenly distributed over the aggregated bundle of two or more links.

* * * * *